United States Patent [19]

Stewart

[11] Patent Number: 4,671,837
[45] Date of Patent: Jun. 9, 1987

[54] PROCESS FOR FORMING COMPOSITE MOLDS TO BE USED IN THE MANUFACTURE OF COMPOSITE PARTS

[76] Inventor: Robert B. Stewart, 2101 Illinois Ave., Boise, Id. 83706

[21] Appl. No.: 765,696

[22] Filed: Aug. 15, 1985

[51] Int. Cl.⁴ .................. B29C 65/02; B32B 31/04
[52] U.S. Cl. ............................. 156/245; 156/307.1; 264/219
[58] Field of Search ............... 156/245, 307.1; 264/219, 220, 226, 227

[56] References Cited

U.S. PATENT DOCUMENTS

| | | | |
|---|---|---|---|
| 2,402,528 | 6/1946 | Bean | 156/245 |
| 2,934,399 | 4/1960 | Morse | 264/227 |
| 3,035,310 | 5/1962 | Sokol et al. | 156/245 |
| 3,839,120 | 10/1974 | Kilian | 156/245 |
| 4,158,585 | 6/1979 | Wright | 156/245 |

Primary Examiner—Caleb Weston
Attorney, Agent, or Firm—B. Deon Criddle

[57] ABSTRACT

A method of and apparatus for forming composite parts comprising producing a composite mold surface having a high fiber volume and that is resistant to crazing, backing the mold surface with Viton rubber extending beyond the outermost peripheries of a part to be formed in the mold surface with heat and pressure and securing the Viton rubber in place, preferably using a composite mold base structure and with the Viton rubber clamped between the mold surface or by other mechanical means such as a composite retainer on the composite mold surface to receive and protect the edge of the Vitonrubber.

8 Claims, 3 Drawing Figures

PROCESS FOR FORMING COMPOSITE MOLDS TO BE USED IN THE MANUFACTURE OF COMPOSITE PARTS

BRIEF DESCRIPTION

1. Field of the Invention

This invention relates to the making of composite parts using composite molds and vacuum and/or pressure forming.

2. Background of the Invention

For many years the aircraft industry has had difficulty building molds suitable for producing composite parts using vacuum bag molding techniques. The major difficulty has been in producing molds that will maintain their vacuum integrity at temperatures in excess of 250 degrees F. for extended production runs. At the present time surface coats of heavily filled epoxy resins are generally to provide both a smooth surface finish coat for the laminate mold and the necessary vacuum integrity. So long as the cure temperatures used are 250 degrees F., or less, such molds are acceptable and have a life expectancy that will allow them to be used in the manufacture of several production parts. It has been found, however, that when the cure temperature for composite graphite parts reaches 300 to 350 degrees F. the epoxy in the laminate molds begins to deteriorate at an accelerated rate. This deterioration results in premature crazing of the surface coat and the crystallization of resin within the laminate. Leak paths then develop through the molds. Vacuum integrity is lost and this may result in porosity in any parts formed in the laminate mold. Many parts may be produced before the porosity is observed and often such parts can only be scrapped.

OBJECTS OF THE INVENTION

Principal objects of the present invention are to provide a method of producing composite parts without porosity Other objects are to provide a mold for making composite parts that will maintain vacuum integrity and a durable surface to produce uniform acceptable parts even when subjected to temperatures of 350 degrees F. or higher.

Another object is to provide a mold that will direct any leakage that may occur to vacuum outwardly of the area in which a composite part is formed.

Still other objects are to provide a method and apparatus that are adaptable to the productions of composite parts of differing configurations and that can be readily used by relatively unskilled persons.

FEATURES OF THE INVENTION

Principal features of the present invention include forming a mold for composite parts by laying up a composite laminate surface having the reverse configuration of the part surface desired; placing a layer of uncured Viton rubber (either as a unitary sheet or as abutting but not over lapping piece) over a back of the laminate surface and to extend outwardly therefrom in all directions; and securing the Viton sheet to the laminate surface using adhesive, temperature and pressure to shape and mold the Viton rubber. Viton rubber is a gas-impervious rubber material and "VITON" is a registered trademark of the DuPont Corporation.

Another principal feature of the invention comprises forming a high pressure laminate surface of a high fiber volume. This is achieved by compacting plies of fabric tightly together and removing excess resin. The surface is resistant to crazing or deterioration, with an underlying membrane of Viton rubber to seal against leak paths developing through the mold in the part area.

In one preferred embodiment the Viton sheet is further mechanically secured to the laminate surface by formation of a composite mold base structure that sandwiches the Viton rubber sheet between said composite mold and the laminate surface and with the edge of the Viton rubber sheet projecting beyond the outermost edge of the laminate surface. An adhesive strip may be provided on a surface of the composite mold base to receive and hold a vacuum bag through which a negative pressure is developed between the bag and the mold.

In another preferred embodiment, the laminate surface is pre-formed and is wrapped with a Viton sheet to prevent vacuum action on the part being formed such that porosity will result in the part. The Viton rubber is then cured with heat and pressure to bond to the lay-up mold. An adhesive bonding strip may be provided on a retainer surface of the laminate that extends fully around the mold, outwardly of the part being produced, to receive and hold the vacuum bag.

Other objects and features of the invention will become apparent from the following detailed description and drawing disclosing what are presently contemplated as being the best modes of the invention.

THE DRAWING

In the drawings

FIG. 1 is a perspective view of a mold constructed according to the method of the invention and arranged to have a composite part formed therein;

FIG. 2, a transverse section, taken on the line 2—2 of FIG. 1, but showing a composite part, in the mold; and FIG. 3, a view like that of FIG. 2, but showing another embodiment of the mold of the invention.

DETAILED DESCRIPTION

Figure 1:
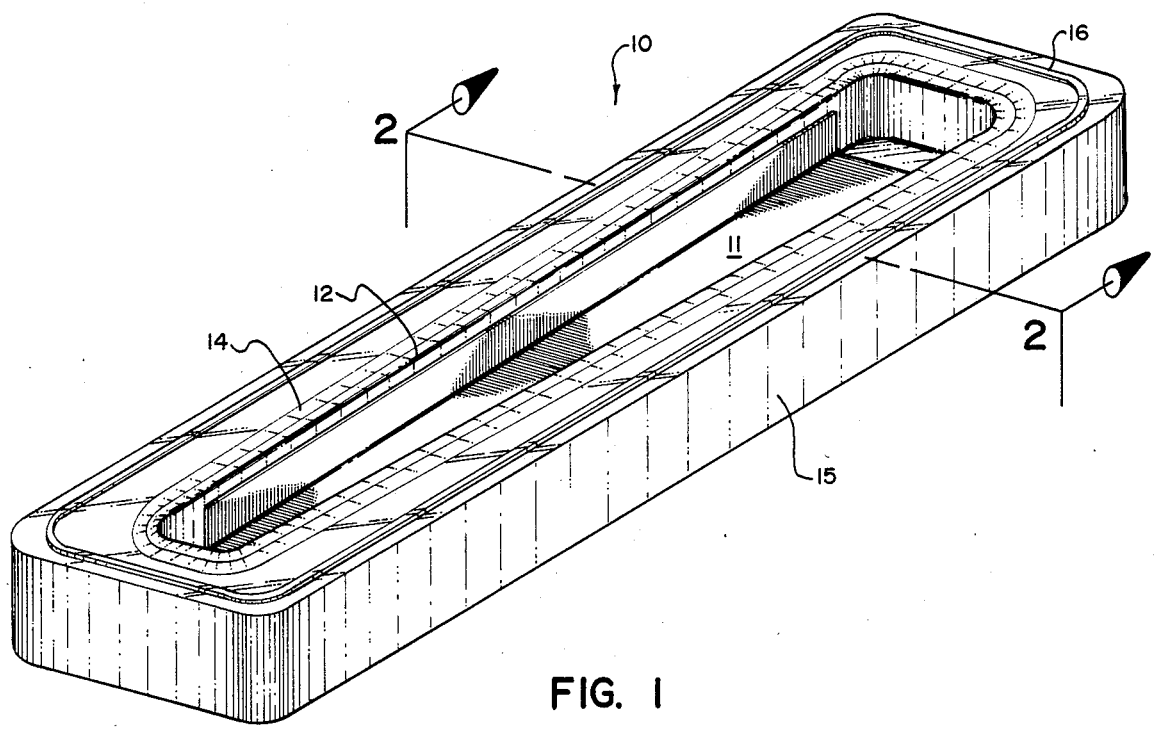
Figure 2:
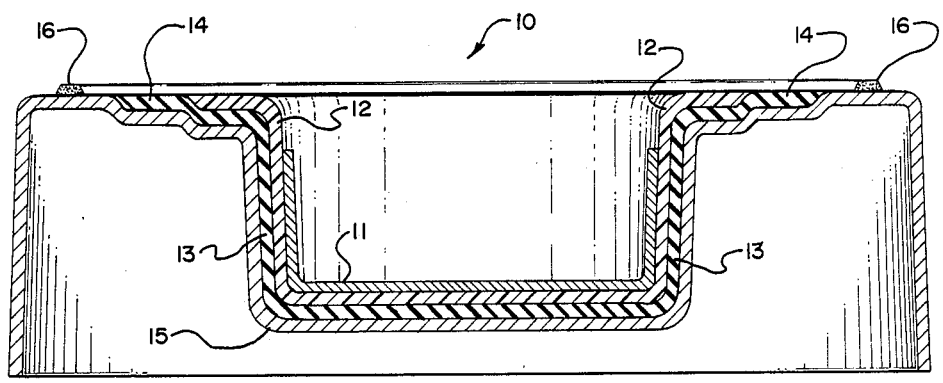
Figure 3:
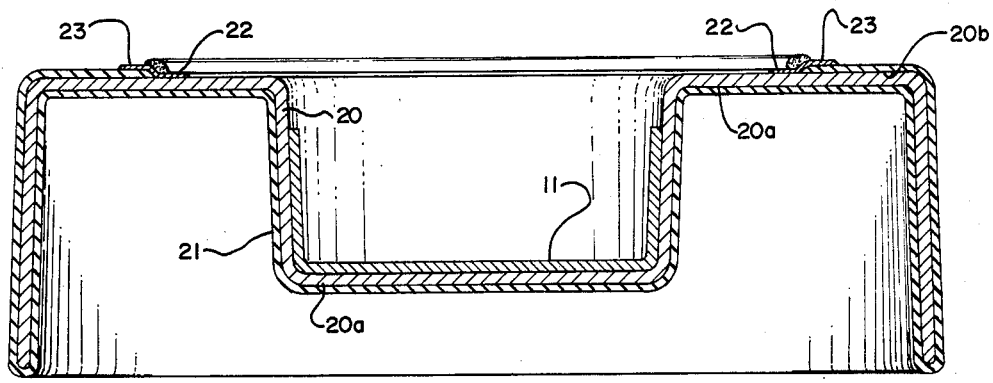

Referring now to the drawings:

The method of the invention is best understood with reference to the preferred embodiments of apparatus shown in FIGS. 1-3.

In the illustrated preferred embodiment of FIGS. 1 and 2, a lay-up mold, shown generally at 10, is adapted to form a composite part such as is shown at 11 in FIG. 2.

The mold is constructed generally by forming a composite laminate mold surface 12. The mold surface 12 is formed on a cathode, not shown, as a reverse shape of the composite mold to be made. Preferably, the mold surface 12 is made as a four ply composite laminate, cured at 350 degrees F. and 90 psi. After the mold surface 12 has cured, uncured Viton rubber 13, is applied to the back of the surface. The Viton rubber fully covers the back of the mold surface 13 and extends outwardly therefrom at 14. A film adhesive may be used to bond the Viton rubber to the back of the mold surface heat and pressure are applied to the rubber to mold it in place and to bond it to the mold.

In the embodiment of FIGS. 1 and 2, a composite mold base structure 15 is formed by generally laying it up over the Viton rubber layer and outwardly beyond the edge of the rubber layer. The mold base structure 15 and the mold surface 12 then clamp the rubber layer between them. A "tacky-tape" double adhesive surface strip 16 may be secured provided therefor the composite mold base and extends fully around the rubber layer. The composite mold base thus cooperates with a vacuum bag (not shown) attached to the strip 16 and thus to the mold base, and overlies the mold surface to permit a negative pressure to be created between the bag and the mold during the formation of composite parts.

As best seen in FIG. 3, a lay-up mold surface 20 may also be wrapped with Viton rubber sheet 21 to provide a suitable mold. While this arrangement is suitable for use with new mold constructions it has also proven very effective as a means of converting previously used molds, whether or not crazing has developed therein, to a mold of the invention.

As shown a retainer 22 is provided around the periphery of the mold surface 20 and the edges of the rubber sheet 21 are secured beneath a lip 23 of the retainer. The rubber sheet is applied in an uncured form and conforms to the configuration of a back side 20a of the mold surface 20, the ends of the mold surface and partially onto a front surface 20b. The rubber sheet is also preferably adhesively bonded to the mold surface and the retainer is adhesively bonded to the mold surface. The bonding agent used is selected to withstand the temperatures involved in the molding process.

In the embodiment of the invention shown in FIGS. 1 and 2, should any crazing or cracking occur in the mold base structure 15 air moving therethrough will engage the rubber sheet and be directed along the sheet to be discharged to the vacuum source outwardly of the article forming portion of the mold.

A typical process of the invention comprises the following steps:

(1) Preparing a cathode (i.e. mold used in the preparation of the lay-up mold and having the configuration of the part to be produced) by cleaning it with methyl ethyl ketone and applying a liquid release agent, such as "Monocoat 91", a product of Chem-Trend, Inc. The release agent is baked to the cathode as instructed by the supplier prevents adhesion of other materials to the surface treated;

(2) Preparing an epoxy impregnated (pre-preg) graphite fabric such as MXG-7620, manufactured by the Fiberite Company by removing selvage from the fabric and cutting the pre-preg into small squares, for example, twenty-four inch squares, maximum size to reduce continuous fiber lengths, thereby reducing effects of resin shrinkage and leakage paths along fibers and then packaging the cut squares to protect them from humidity;

(3) Forming a lay-up mold by marking the perimeter of a four-ply lay-up to be at least two inches beyond the outer trim edge of the part to be formed and then laying up two plies of 2534 fabric pre-impregnated graphite fiber (a fine quality fabric) with zero degree and ninety degree orientation and laying up two additional plies of 2548 fabric (a medium quality fabric) with a plus forty-five degrees and minus forty-five degrees. During and following lay-up of the fabric the materials are debulked, as necessary;

(4) Bagging the lay-up to cure it into a lay-up mold. In this bagging process the four-ply lay-up is covered with a "Teflon" coated porous peel ply such as 234-TFP manufactured by Airtech, Inc. trimmed to be even with the edge of the lay-up. "TEFLON" is a registered trademark of the DuPont Corporation. Thermocouples are inserted through the cover material to permit reading of temperatures therein. A cover of hologen release film, such as A- 4000, manufactured by Airtech, Inc. is placed over the porous peel ply with this cover extending approximately one inch beyond the laminate and is perforated eight inches on center. The edges of the film are taped to restrict edge bleed. Additionally, one ply of Airtech, Inc., N-4 (4 ounce bleeder material) net is applied and trimmed to be even with the edges of the laminate, a ply of Airtech, Inc. A-4000 halogen release film perforated on two inch centers is applied to extend one-half inch past the edge of the laminate and a ply of Airtech, Inc. N-10 net (10 ounce breather material) is applied and trimmed even with the edge of the laminate.

Vacuum ports, spaced not more than forty-two inches apart, and with not less than two ports being used are provided and the entire assembly is bagged with Airtech, Inc. DP 1000 bagging film.

(5) Curing the tool by loading it in an autoclave under vacuum. Applying pressure of 90 psi and heating the tool at the rate of three to five degrees F. per minute to 180 degrees F. and holding that temprature for one hour; heating the tool at the rate of three to five degrees per hour to a temperature of 250 degrees F. and holding that temperature for three hours. Thereafter, the temperature of the tool is reduced at the rate of five to ten degrees per minute to 100 degrees F., before releasing the pressure.

(6) All consumables are stripped away, while being careful not to move the laminate.

(7) Viton rubber is applied to the back surface of the laminate by first applying one ply of American Cyanamid Co. FM 400 modified epoxy adhesive film thereto and extending to the edges of the laminate. Thereafter, the surfaces of the Viton rubber pieces are wiped with methyl ethyl ketone and the pieces are applied to the FM 400 layer with adjacent edges of the pieces abutting but not overlapping and with a maximum spacing between pieces of 0.030 inch. The Viton rubber is extended one-fourth inch beyond the edge of the four-ply laminate.

(8) The Viton rubber is covered with one ply of Airtech, Inc. A 4000 release film perforated on six inch centers and extending one inch beyond the edges of the Viton rubber. The release film is covered with one ply of Airtech, Inc. N-4 breather material and the assembly is bagged with Airtech, Inc. DP 1000 bagging film and debulked at 150 degrees F. and 20 psi. Debulking vacuum is maintained until room temperature is obtained, at which time the assembly is debagged. Any gaps in the Viton rubber are then filled with small pieces of Viton rubber bonded in place with methyl ethyl ketone or with a paste made by dissolving Viton rubber in methyl ethyl ketone and applied with a trowel.

(9) A base mold is formed by laying one ply of Fiberite 2534, 0 degree, over the exposed cathode surface and one-fourth inch beyond the edge of Viton rubber. One ninety degree ply of Fiberite 2548 is laid over the entire surface of Viton rubber and 2534 fabric. Eight plies of Fiberite 2577 are applied at 0, 90, +45, −45, +45, 90 and 0 degrees.

(10) If deemed necessary the assembly can be debulked by applying a perforated ply of Airtech, Inc. A-4000 halogen release film, a ply of Airtech, Inc. N-4 breather material, bagging the assembly and debulking for a minimum of four hours at room temperature.

(11) The assembly, including the base mold lay-up is bagged in the same manner described in step (4), except that N-10 bleeder is used rather than the N-4 bleeder used in step 4.

(12) The bagged assembly is cured in an autoclave. The entire assembly is placed in an autoclave in a level position and under vacuum. Pressure of one-hundred psi is applied, with the vacuum being vented at 20 psi. The mold is then heated at a rate of three to five degrees F. per minute to 180 degrees F., at which time the temperature is maintained for one hour. The mold is then heated at a rate of three to five degrees per minute to 250 degrees F., at which it is held for one hour. The mold is then again heated to increase the temperature at a rate of three to five minutes until 300 degrees F. is reached, at which it is held for two hours. Thereafter the mold is again heated to increase in temperature at a rate of three to five degrees per minute until 350 degrees F. is reached. The mold is then maintained at the temperature for one hour before the temperatre is reduced back to 100 degrees F. at the rate of five to ten degrees per minute.

It is to be understood that the foregoing example is of a typical process incorporating the invention and that the processing times, temperatures, particular films used and other materials will vary in accordance with the resin system used and established processes.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A method of forming a composite mold for the production of composite parts comprising the steps of
    (a) forming a cathode of the part;
    (b) laying-up fabric pre-impregnated with epoxy resin on the cathode to form a tool for a composite part to be created;
    (c) bagging the cathode and tool;
    (d) subjecting the cathode, tool and bag to sufficient temperature and pressure to cure the tool;
    (e) debagging the cathode, tool and bag to remove all consumables;
    (f) applying uncured rubber to completely cover the back of the tool and beyond the edges thereof;
    (g) debulking the rubber;
    (h) bagging the tool and rubber; and
    (i) applying temperature and pressure to cure the rubber and to mold and bond the rubber to the tool.

2. A method as in claim 1, further including protecting the rubber layer from separation from the tool.

3. A method as in claim 1, wherein steps (d) and (i) are accomplished by autoclaving.

4. A method as in claim 2, wherein the rubber is protected form separation from the tool by forming a base mold layed up from composite materials at the surface of the rubber opposite the tool.

5. A method as in claim 4, wherein the base mold is formed with a surface surrounding and extending outwardly of the outer edge of the rubber.

6. A method as in claim 2, wherein the rubber layer is protected from separation from the tool by a retainer that is thereafter fitted over the outer edge of the rubber to hold the edge in place.

7. A method of forming a composite mold as a tool for the production of composite parts comprising
    (a) forming a cured tool to conform to a cathode of the part to be formed;
    (b) applying uncurred rubber to cover the back of the tool and beyond the outer edges thereof;
    (c) debulking the rubber; and
    (d) applying temperature and pressure to cure the rubber and to mold and bond the rubber to the tool.

8. The method of claim 7, further including
    making a paste of rubber dissolved in methyl ethyl ketone and troweling such paste into any spaces on the back of the tool not covered rubber; and allowing the paste to cure.

* * * * *